(12) United States Patent
Seletskiy et al.

(10) Patent No.: US 12,388,842 B2
(45) Date of Patent: Aug. 12, 2025

(54) SYSTEMS AND METHODS FOR DEDUPLICATING MALWARE SCAN ATTEMPTS IN A NETWORK

(71) Applicant: Cloud Linux Software Inc., Estero, FL (US)

(72) Inventors: Igor Seletskiy, Palo Alto, CA (US); Andrey Kucherov, Tula (RU)

(73) Assignee: Cloud Linux Software, Inc., Estero, FL (US)

( * ) Notice: Subject to any disclaimer, the term of this patent is extended or adjusted under 35 U.S.C. 154(b) by 303 days.

(21) Appl. No.: 17/898,529

(22) Filed: Aug. 30, 2022

(65) Prior Publication Data

US 2024/0073224 A1  Feb. 29, 2024

(51) Int. Cl.
*H04L 9/40* (2022.01)
*G06F 16/215* (2019.01)

(52) U.S. Cl.
CPC ........ *H04L 63/1416* (2013.01); *G06F 16/215* (2019.01)

(58) Field of Classification Search
None
See application file for complete search history.

(56) References Cited

U.S. PATENT DOCUMENTS

| | | | | |
|---|---|---|---|---|
| 9,219,707 B1* | 12/2015 | Mesropian | ............ | G06F 21/577 |
| 9,781,144 B1* | 10/2017 | Otvagin | ................ | G06F 21/566 |
| 10,250,623 B1* | 4/2019 | Patton | ..................... | G06F 21/00 |
| 2010/0169972 A1* | 7/2010 | Kuo | ....... | G06F 21/564 |
| | | | | 707/E17.001 |
| 2013/0318606 A1* | 11/2013 | Stolfo | ................... | G06F 21/552 |
| | | | | 726/23 |
| 2014/0208426 A1* | 7/2014 | Natarajan | ............ | G06F 21/562 |
| | | | | 726/23 |
| 2015/0180997 A1* | 6/2015 | Ramanan | ................ | G06F 21/56 |
| | | | | 709/214 |
| 2019/0222586 A1* | 7/2019 | Sachkov | ............. | H04L 63/1416 |

* cited by examiner

*Primary Examiner* — Christopher C Harris
(74) *Attorney, Agent, or Firm* — ArentFox Schiff LLP; Michael Fainberg

(57) ABSTRACT

Disclosed herein are systems and method for deduplicating malware scan attempts. In one exemplary aspect, a method may include: receiving, from a first computing device of a plurality of computing devices in a network, a first hash value of an object and a verdict of a malware scan performed on the object by the first computing device; storing the first hash value and the verdict in a shared verdict database; receiving, from a second computing device in the network, a verdict request including a second hash value; determining that the first hash value and the second hash value match; in response to determining the match, transmitting, to the second computing device, the verdict of the malware scan performed on the object by the first computing device, wherein the second computing device does not perform a redundant malware scan on the object.

7 Claims, 8 Drawing Sheets

SYSTEMS AND METHODS FOR DEDUPLICATING MALWARE SCAN ATTEMPTS IN A NETWORK

FIELD OF TECHNOLOGY

The present disclosure relates to the field of malware scanners, and, more specifically, to systems and methods for deduplicating malware scan attempts in a network.

BACKGROUND

One of the biggest challenges of creating an efficient malware scanner is managing computing resource consumption. There are several tools available on the market, but the more security tools are used on a system, the fewer system resources remain available for other intended user activity. In light of that fact, it becomes crucial to reduce the amount of time and resources spent on each object (e.g., each file or any other item a scanner may operate on such as domain names, database objects, etc.) during scanning.

SUMMARY

To address the shortcomings of conventional malware scanners and security tools described above, aspects of the disclosure describe methods and systems for deduplicating malware scan attempts in a network.

In one exemplary aspect, a method may include: receiving, from a first computing device of a plurality of computing devices in a network, a first hash value of an object stored on the first computing device and a verdict of a malware scan performed on the object by the first computing device; storing the first hash value and the verdict in a shared verdict database; receiving, from a second computing device of the plurality of computing devices in the network, a verdict request including a second hash value; determining that the first hash value and the second hash value match, wherein the match indicates that the object is stored on both the first computing device and the second computing device; in response to determining the match, transmitting, to the second computing device, the verdict of the malware scan performed on the object by the first computing device, wherein the second computing device does not perform a redundant malware scan on the object.

In some aspects, the techniques described herein relate to a method, further including: prior to receiving the first hash value and the verdict associated with the object from the first computing device, receiving a verdict request including the first hash value; in response to determining that the first hash value does not match any respective hash value in the shared verdict database, transmitting, to the first computing device, an indication to perform the malware scan locally on the object.

In some aspects, the techniques described herein relate to a method, further including: applying a filter on the first hash value to incorporate the first hash value in a probabilistic data structure, wherein determining whether the first hash value and the second hash value match includes determining whether a representation of the second hash value subsequent to applying the filter is present in the probabilistic data structure.

In some aspects, the techniques described herein relate to a method, wherein the filter is a bloom filter or a similar probabilistic data structure object.

In some aspects, the techniques described herein relate to a method, further including: periodically transmitting, for local storage, a cached version of the shared verdict database to each computing device of the plurality of computing devices in the network, wherein a respective computing device generates verdict requests for the cached version, and in response to not finding matches in the cached version, transmits the verdict requests for the shared verdict database.

In some aspects, the techniques described herein relate to a method, wherein transmitting, to the second computing device, the verdict of the malware scan performed on the object by the first computing device is further in response to determining that at least a threshold number of computing devices in the network independently generated the verdict for the object.

In some aspects, the techniques described herein relate to a method, further including: generating statistics for the object indicative of one or more of: (1) computing devices where the object is located, (2) a lifetime of the object on each of the computing devices, (3) an amount of changes to the object across the computing devices, and (4) an amount of verdicts for the object across the computing devices.

In some aspects, the techniques described herein relate to a method, further including: generating, on a user interface, a visualization based on the statistics; generating rules for creating alerts on the user interface after a threshold number of duplicates of the object have formed in the network.

It should be noted that the methods described above may be implemented in a system comprising a hardware processor. Alternatively, the methods may be implemented using computer executable instructions of a non-transitory computer readable medium.

In some aspects, the techniques described herein relate to a system for deduplicating malware scan attempts, including: a memory; and a hardware processor communicatively coupled with the memory and configured to: receive, from a first computing device of a plurality of computing devices in a network, a first hash value of an object stored on the first computing device and a verdict of a malware scan performed on the object by the first computing device; store the first hash value and the verdict in a shared verdict database; receive, from a second computing device of the plurality of computing devices in the network, a verdict request including a second hash value; determine that the first hash value and the second hash value match, wherein the match indicates that the object is stored on both the first computing device and the second computing device; in response to determining the match, transmit, to the second computing device, the verdict of the malware scan performed on the object by the first computing device, wherein the second computing device does not perform a redundant malware scan on the object.

In some aspects, the techniques described herein relate to a non-transitory computer readable medium storing thereon computer executable instructions for deduplicating malware scan attempts, including instructions for: receiving, from a first computing device of a plurality of computing devices in a network, a first hash value of an object stored on the first computing device and a verdict of a malware scan performed on the object by the first computing device; storing the first hash value and the verdict in a shared verdict database; receiving, from a second computing device of the plurality of computing devices in the network, a verdict request including a second hash value; determining that the first hash value and the second hash value match, wherein the match indicates that the object is stored on both the first computing device and the second computing device; in response to determining the match, transmitting, to the second computing device, the verdict of the malware scan performed on the object by the first computing device, wherein the second computing device does not perform a redundant malware scan on the object.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
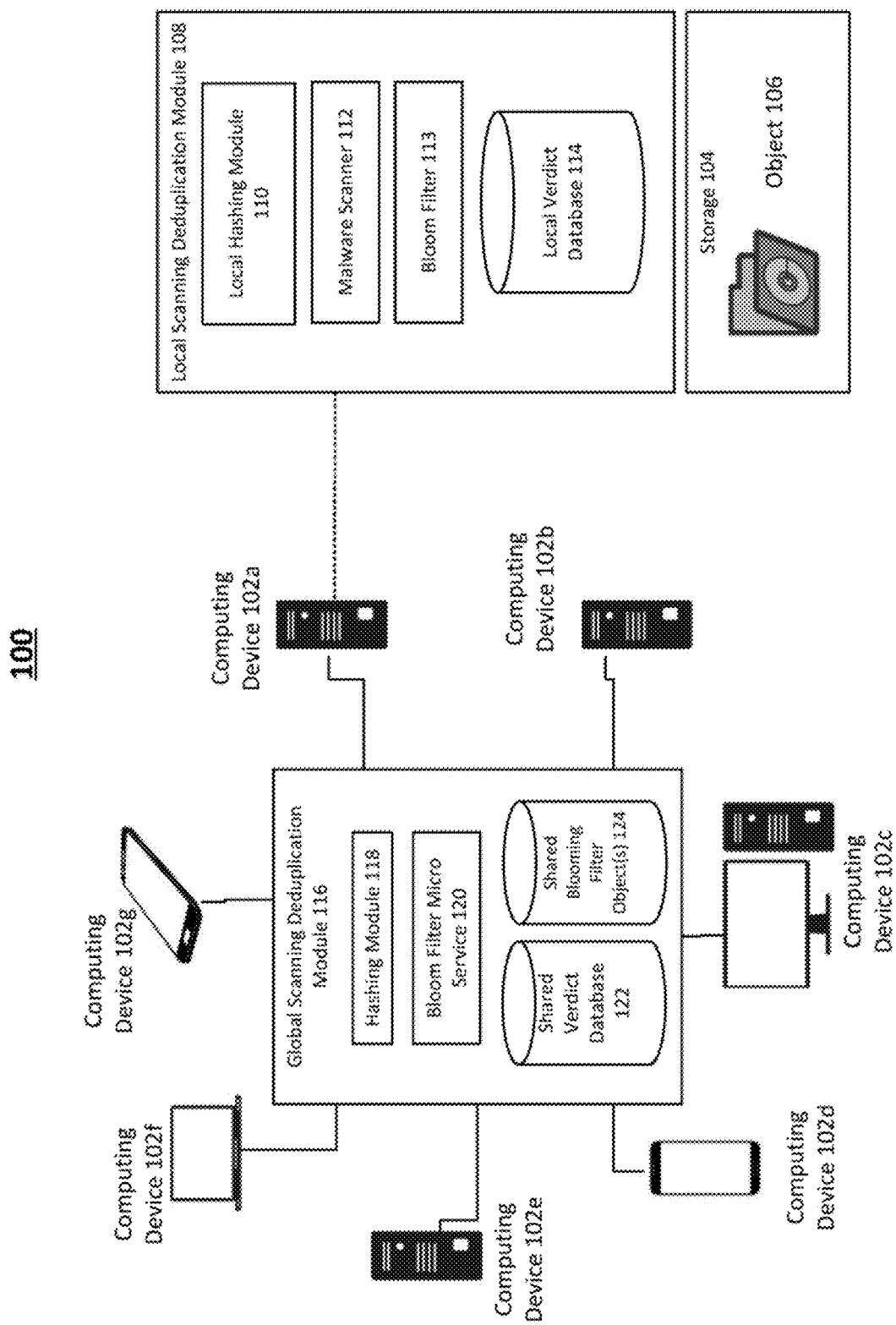
FIG. 1 is a block diagram illustrating a system for deduplicating malware scan attempts in a network.

Exemplary aspects are described herein in the context of a system, method, and computer program product for deduplicating malware scan attempts in a network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to overcome the shortcomings described in the background, the present disclosure describes deduplicating scanning attempts of the same objects at a given time frame and tracking scan attempts in a database. This ultimately saves system resources without sacrificing security because not all objects have to be scanned as some objects are pre-determined to be non-malicious. The systems and methods of the present disclosure can be performed on a single node or a distributed database cluster, and enable making intelligent decisions on scanning objects and monitoring file spreading.

A direct approach to scanning without deduplication requires scanning all objects on every scanning attempt, despite the fact that a given file may not have changed since the last time it was scanned. A more advanced scanning approach may take timestamp and file change parameters into consideration. For example, if the same file is located in different directories, the file will be scanned multiple times. On a larger scale, if the same file is located in different servers, the amount of the same files scanned multiple times on multiple servers begins to grow even further. This can be especially relevant in environments such as shared hosting where individual users may store the same files multiple times across many directories and servers, each for their own individual purpose. Deduplication has a greater effect as more data is aggregated. In other words, such a system will be scalable and more effective with a greater incoming load.

Consider an example in which a web developer A produces PHP-based software B that represents a custom-coded script for a website guestbook. Software B is a commercial software that is obfuscated and has closed source code. Software B becomes popular among website administrators and a number of website owners purchase software B and install it on their websites. Hosting companies C, E, and F, that host websites where software B is installed, use malware scanning software X that supports shared API endpoint Y with data on each scanned object. The scanner on the server of hosting company C is first among other servers across all hosting companies that scan the files of software B and determines that software B is not malicious. Data is reported to endpoint Y. Scanning processes of X on the servers of C, E, and F now skip (i.e., do not scan) the corresponding files of software B because endpoint Y returns the verdict for these objects as non-malicious. The verdicts are directly associated with files without spending additional computational resources of the servers for scanning.

FIG. 1 is a block diagram illustrating system 100 for deduplicating malware scan attempts in a network. Suppose that the plurality of computing devices 102 include computing device 102a, 102b, 102c, 102d, 102e, 102f, and 102g. Each computing device may be a different type of device. For example, computing devices 102a, 102b, and 102e are servers, computing devices 102d and 102g are smartphones, computing device 102f is a laptop, and computing device 102c is a computer. The plurality of computing devices 102 may be part of the same network (e.g., a local area network or a wide area network). Each of the computing devices may also be connected to an API endpoint referred to as global scanning deduplication (GSD) module 116, which stores, aggregates, and interprets collected data—allowing local or remote scanning processes to retrieve information in each object being scanned.

In some aspects, GSD module 116 may be installed on a server that is part of the network including the plurality of computing devices 102.

Each of the plurality of computing devices 102 may have a local scanning deduplication (LSD) module 108. In some aspects, LSD module 108 is a local extension of GSD module 116. For example, GSD module 116 may be a cloud application and LSD module 108 may be a locally installed version of the cloud application. Both modules may be configured to send and receive information. In some aspects, LSD module 108 and GSD module 116 may each be part of an anti-virus software application/suite.

LSD module 108 includes local hashing module 110, malware scanner 112, bloom filter 113, and local verdict database 114. Suppose that computing device 102a has a local storage 104 that includes object 106. In the present disclosure, objects may be files of various file types such as applications, documents, videos, images, scripts (e.g., PHP, JS, etc.), binary files, etc. At a first time, malware scanner 112 may scan object 106 and generate a verdict indicating whether object 106 is "malicious" or "non-malicious." LSD module 108 may store the verdict in local verdict database 114.

At a subsequent time, malware scanner 112 may need to rescan storage 104. Rather than re-scanning object 106, malware scanner 112 may determine whether object 106 has changed since the first scan. In order to identify a change, a hash of object 106 may be used. For example, during the first scan, local hashing module 110 may determine a hash value of object 106. During the second scan of storage 104, local hashing module 110 may redetermine a hash value of object 106. If the hash values match, LSD module 108 may determine that the object did not change and therefore the verdict from the first scan can be reused for the second scan. Malware scanner 112 may thus skip object 106 during the scanning and simply record the original verdict.

As discussed, object identification is made based on hashing algorithms such as sha256. Hashing may be applied to raw unmodified contents of the object or to its normalized version. Normalization may include simple data preparation such as the removal of extra spaces and comments (e.g., pieces of code that are not executed or displayed) from the objects as well as complex data preparation such as various types of tokenization of strings and operators inside code, abstract syntax tree generation where the hash is taken from the syntax tree rather than from actual contents of the object, or another set of layers of data preparation and preprocessing that can result in the more general representation of the objects. This leads to identifying objects with similar or close to similar contents as one and the same identification hash, which leads to getting these group objects being labeled with the same verdict.

As local verdict database 114 aggregates a plurality of verdicts and hashes, the search time for local verdict database 114 may increase. In order to reduce the time spent on finding matching hashes, LSD module 108 may apply bloom filter 113 to all object hash values. Bloom filter 113 changes the representation of the object hash values into simplified values that are easier and faster to look up. The simplified values are stored in a probabilistic data structure. For example, suppose that the verdict for object 106 is "malicious." LSD module 108 may apply bloom filter 113 on the hash value of object 106. In a simple scenario, this may involve mapping the hash value to a 64-bit structure. For example, LSD module 108 may determine that hash (object 106) % 64=3. Because the verdict is "malicious," the third bit in the probability data structure is changed from 0 to 1. If the verdict was "non-malicious," the third bit remains 0. The next time a scan is performed on storage 104, bloom filter 113 may be applied on the hash value of object 106. The result may be 3, and because there is a 1 in the probability data structure, LSD module 108 may determine that the object is malicious.

Because bloom filter 113 is a probabilistic approach, it should be noted that if a file has changed or a new file is scanned, the lookup may not be effective. This is because the filter will still point to a particular part of the probabilistic data structure and that part may be either a 0 or a 1. If the file has changed or a new file that has not been scanned before is considered, an incorrect verdict will be assigned. Accordingly, prior to applying bloom filter 113 to determine whether a verdict exists, LSD module 108 may need to track whether the object was previously scanned. If the object was previously scanned, then the bloom filter may be applied. If the object was not scanned or has changed, the bloom filter may not be applied. In some aspects, LSD module 108 may execute a different bloom filter that simply tracks objects that have been scanned already (i.e., if the result from that bloom filter yields a bit that is 1, then the object has been scanned and bloom filter 113 can be used to determine the verdict).

Up until now, local scanning has been described. However, the present disclosure enables for the skipping of scanning object 106 on computing device 102a if a verdict for the object already exists. In particular, system 100 leverages the plurality of computing devices as a whole and GSD module 116 to reduce processing on singular computing devices.

GSD module 116 includes hashing module 118, bloom filter micro service 120, shared verdict database 122, and shared blooming filter objects 124. Suppose that object 106 is also stored on computing device 102b. Computing device 102b may have locally scanned object 106, determined its hash value, and may have stored a verdict of the malware scan locally. In an exemplary aspect, the LSD module on computing device 102b may synchronize verdicts and hash values with GSD module 116, which stores these values and verdicts in shared verdict database 122. As a result, when a different computing device (e.g., computing device 102a) scans object 106 at a subsequent time, LSD module 108 may determine the hash value of object 106 and transmit a verdict request to GSD module 116. In some aspects, LSD module 108 may transmit object 106 to GSD module 116, which uses hashing module 118 to determine the hash value.

GSD module 116 may search for the hash value in shared verdict database 122. Upon finding a match, GSD module 116 may transmit the verdict back to LSD module 108, which in turn skips the scanning of object 106. If the verdict is malicious, then LSD module 108 may execute a remediation action (e.g., object removal, quarantine, etc.). If the verdict is non-malicious, no further action may be taken. In some aspects, subsequent to receiving the verdict from GSD module 116, LSD module 108 may store the verdict and the hash value in local verdict database 114. Because the scanning results of the computing devices are available to one another, both the individual processing requirements and collective processing requirements are reduced.

Similar to the local application of bloom filter 113 by LSD module 108 to improve lookup times, GSD module 116 may execute bloom filter micro service 120 which may apply a bloom filter and store a global probability data structure (i.e., in the database labelled shared blooming filter object 124). Bloom filter micro service 120 may determine a simplified representation of an object hash value and map it to the global probability data structure such that lookups for verdicts generated by the plurality of computing devices 102 are fast and efficient.

In some aspects, shared blooming filter object(s) 124 may include multiple probabilistic data structures acquired from different computing devices 102. For example, each LSD module from a computing device may transmit its probabilistic data structure to GSD module 116, which stores the data structures in shared blooming filter object(s) 124. Whenever a verdict request is received by GSD module 116, GSD module 116 may determine whether the object hash value exists in the shared blooming filter object(s) 124. If the object hash value does exist, the associated verdict is returned to the requesting computing device.

Figure 2:
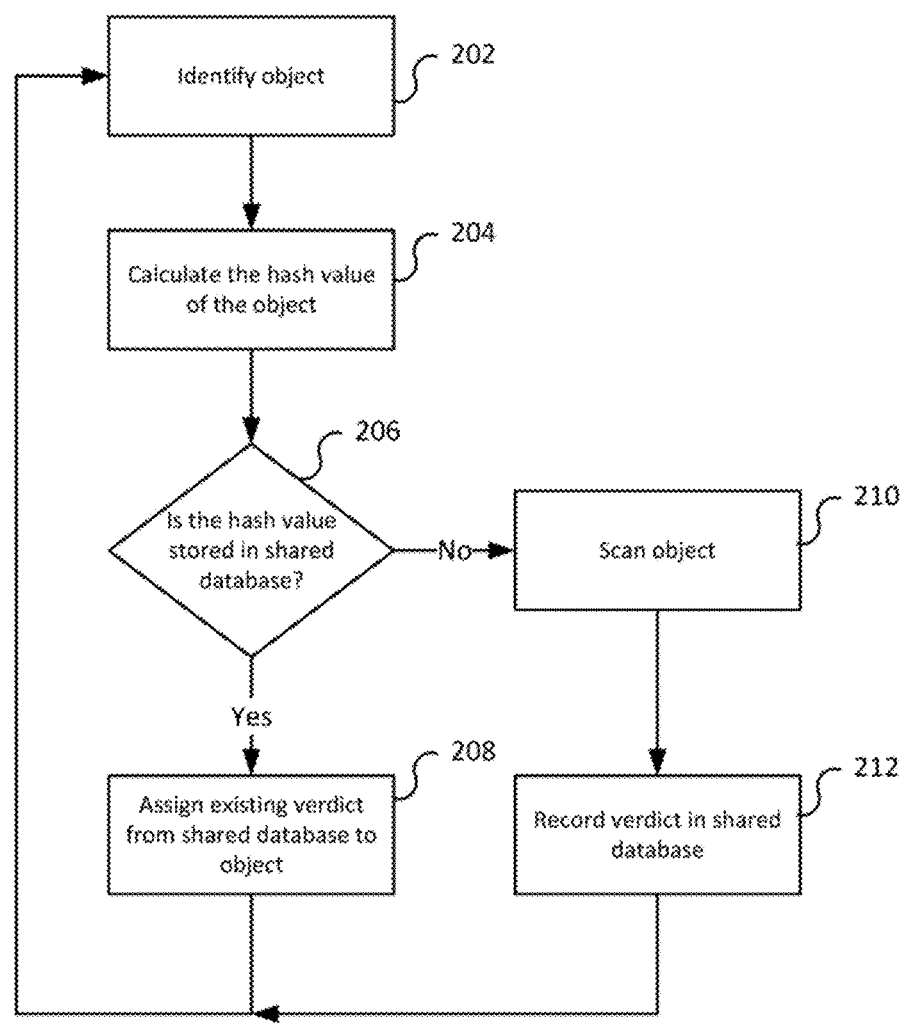
FIG. 2 is a flow diagram of a method for assigning a verdict to an object based on hashes in a shared database.

FIG. 2 is a flow diagram of method 200 for assigning a verdict to an object based on hashes in a shared database. In FIG. 2, the verdicts for multiple concurrent scanning modules 108 can be shared in real-time using the illustrated approaches and algorithms. Several concurrent modules 108 check different locations and record their verdicts in a shared database. If one of the processes already encountered the object, the scanning step is skipped and the computing capacity (e.g., server CPU, memory, and disk input/output capacity) is saved for other processes on the computing device. This ultimately reduces the processing load on the computing device.

At 202, LSD module 108 identifies an object such as object 106 installed on computing device 102a. For example, object 106 may be a software application. At 204, LSD module 108 calculates the object's hash value. At 206, GSD module 116 determines whether the hash value is stored in shared verdict database 122. If the hash value is not stored in shared verdict database 122, at 210, LSD module 108 proceeds to scan object 106. At 212, the verdict from that malware scan is recorded in shared verdict database 122 (i.e., LSD module 108 scans and transmits the verdict to GSD module 116). Ideally the hash value is already stored in shared verdict database 122. If so, method 200 advances to 208, where LSD module 108 assigns the existing verdict in shared verdict database 122 to object 106. From 208 and 212, method 200 returns to 202, where LSD module 108 scans the next object in storage 104.

Figure 3:
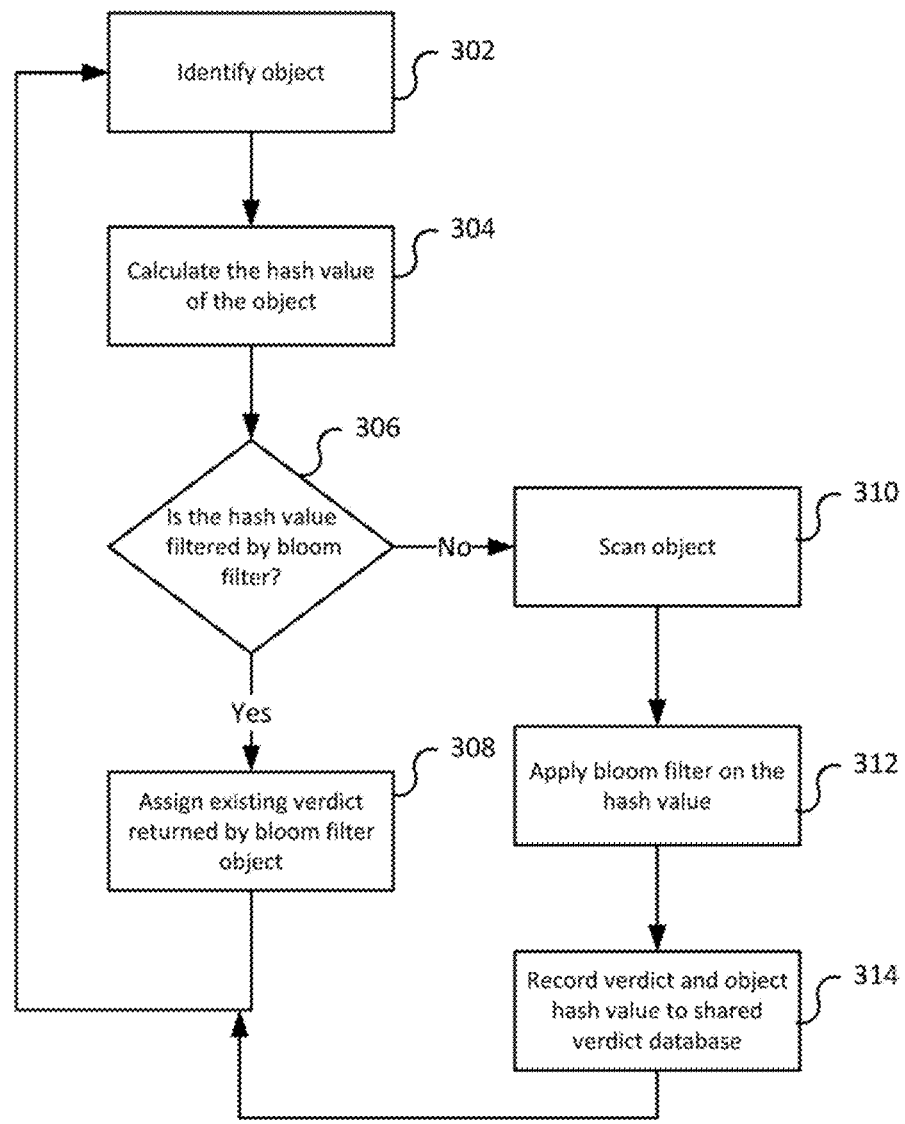
FIG. 3 is a flow diagram of a method for assigning a verdict to an object based on hashes filtered by a bloom filter.

FIG. 3 is a flow diagram of method 300 for assigning a verdict to an object based on hashes filtered by a bloom filter. In FIG. 3, the usage of a local bloom filter microservice is illustrated. This approach is similar to method 200, but uses a bloom filter for hashes. By using the bloom filter, the number of objects to be potentially filtered out is increased. Computing costs for using bloom filter are less than for the scanning process, so it is beneficial in terms of saving computing capacity. The approach with the bloom filter also requires an initial hash to match the database, and the interaction with the scanning process happens not directly, but through a bloom filter microservice.

The bloom filter can be replaced with any similar space-efficient (i.e., using a low amount of memory) probabilistic data structure(s) or service(s) based on it. The bloom filter in the example above is of the application of such probabilistic data structures, but implementation is not limited exclusively to bloom filter algorithms and can be based on any similar probabilistic filter approach.

The distributed approach works similarly to the local, except that the population of the hash to verdict matches database happens not only through a local database or local bloom filter (or other probabilistic data structure(s)) microservice, but also by exchanging the data with a central global remote storage containing aggregate verdicts from multiple server scan processes. Global remote storage can be used in conjunction with a local database or without it, providing verdicts directly to the scanning process through the network.

At 302, LSD module 108 identifies an object such as object 106 installed on computing device 102a. For example, object 106 may be a document. At 304, LSD module 108 calculates the object's hash value. At 306, LSD module 108 determines whether the hash value is filtered by bloom filter 113. If the hash value is not filtered, at 310, LSD module 108 proceeds to scan object 106. At 312, LSD module 108 applies bloom filter 113 on the hash value of object 106. At 314, the verdict from that malware scan and the object hash value are recorded in shared verdict database 122 (i.e., LSD module 108 scans and transmits the verdict to GSD module 116). Ideally the hash value has been filtered by bloom filter 113. If so, method 300 advances to 308, where LSD module 108 assigns the existing verdict returned from the bloom filter object (i.e., the probabilistic data structure). From 308 and 314, method 300 returns to 302, where LSD module 108 scans the next object in storage 104.

Figure 4:
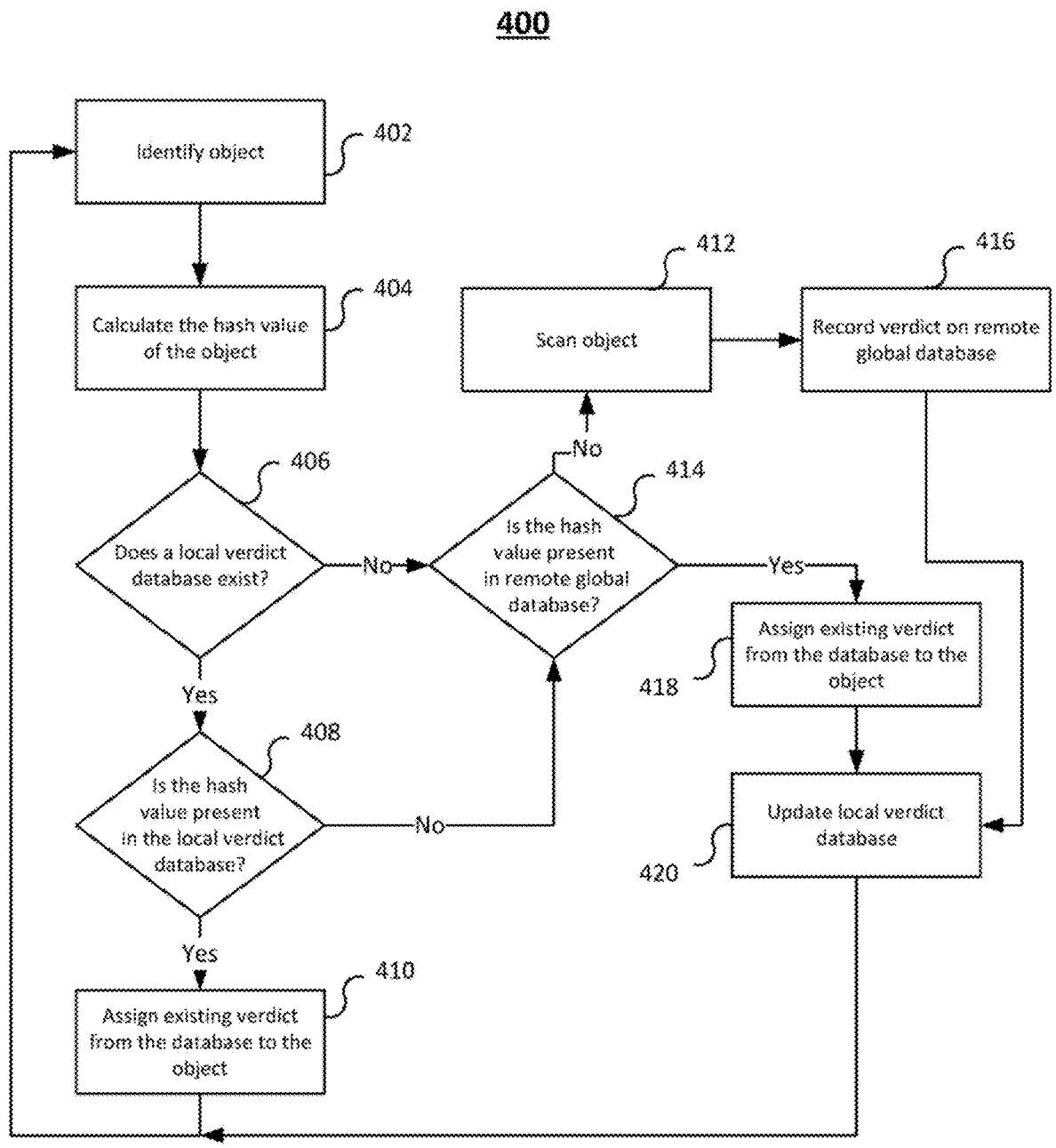
FIG. 4 is a flow diagram of a method for assigning a verdict to an object based on hashes in a local verdict databased and a remote global database.

FIG. 4 is a flow diagram of method 400 for assigning a verdict to an object based on hashes in a local verdict databased and a remote global database. It should be noted that the shared database can be replaced with or used in conjunction with a local cache of the verdicts that is spanned across multiple scanning processes. For example, in FIG. 4, a scanning process queries a remote global storage for verdicts data directly, or in response to determining that the data is not present in a local storage. If the local storage exists, then the response is provided to the scanning process as well as recorded to the local storage.

At 402, LSD module 108 identifies an object such as object 106 installed on computing device 102a. For example, object 106 may be a media file. At 404, LSD module 108 calculates the object's hash value. At 406, LSD module 108 determines whether local verdict database 114 exists. If so, method 400 advances to 408, where LSD module 108 determines whether the hash value is stored in local verdict database 114. If the hash value is not present in local verdict database 114 or local verdict database 114 does not exist, method 400 advances to 414, where GSD module 116 determines whether the hash value is stored in shared verdict database 122.

If the hash value is not stored in shared verdict database 122, at 412, LSD module 108 proceeds to scan object 106. At 416, the verdict from that malware scan is recorded in shared verdict database 122 (i.e., LSD module 108 scans and transmits the verdict to GSD module 116). Subsequently, at LSD module 108 updates local verdict database 114. If the hash value is stored in shared verdict database 122, method 400 advances from 414 to 418, where the existing verdict from the database is assigned to the object.

Ideally the hash value is already stored in local verdict database 114. If so, method 400 from 408 to 410, where LSD module 108 assigns the existing verdict in local verdict database 114 to object 106. From 410 and 420, method 400 returns to 402, where LSD module 108 scans the next object in storage 104.

In some aspects, LSD module 108 may accumulate objects without local verdicts and query GSD module 116 in a single verdict request comprising an entire batch of objects.

Figure 5:
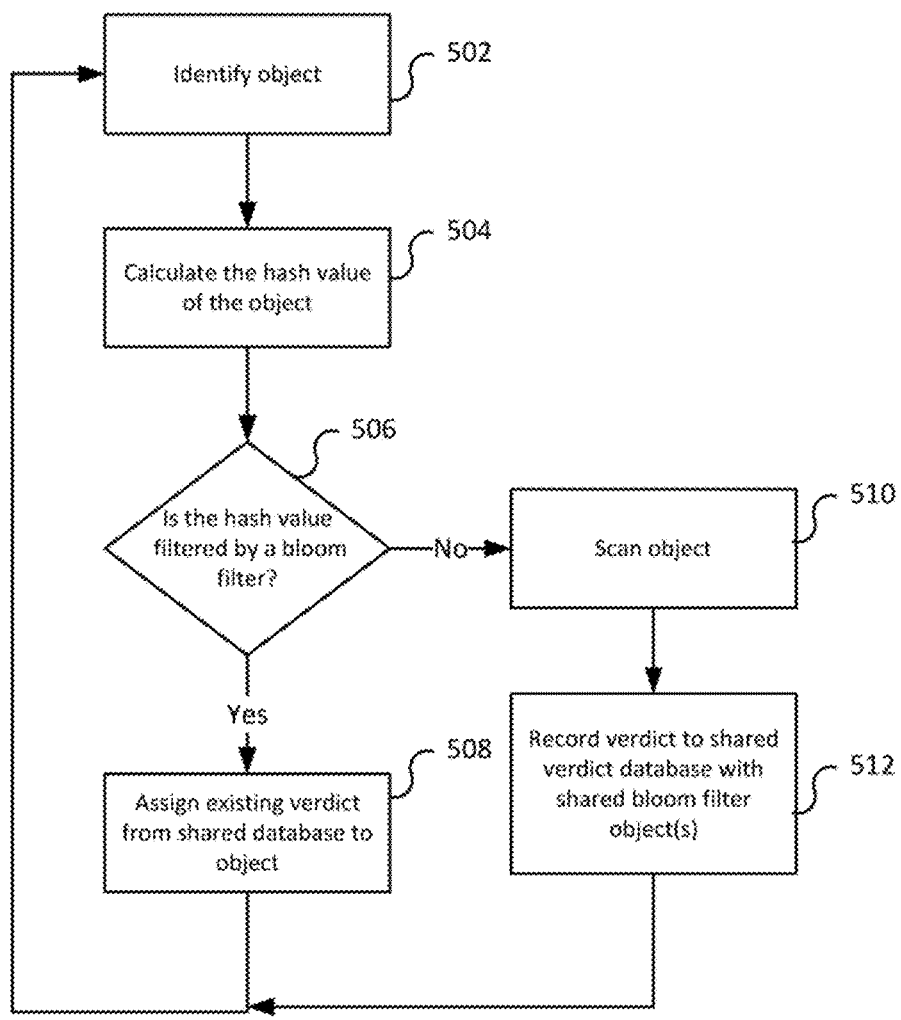
FIG. 5 is a flow diagram of a method for assigning a verdict to an object based on shared bloom filter objects.

FIG. 5 is a flow diagram of method 500 for assigning a verdict to an object based on shared bloom filter objects. In FIG. 5 the scanning process periodically checks if any new updated bloom filter (or other probabilistic data structure(s)) is available and downloads it to use locally (on disk or directly to RAM). For such an approach, a database with objects is not stored locally on servers and if the scanning process encounters an unfiltered object, it is directly reported to the remote global storage. The bloom filter microservice can use a cascade of bloom filter objects to perform the filtration (e.g., multilayered filtration). As was mentioned, bloom filter algorithms can be replaced by other similar probabilistic data structure(s).

At 502, LSD module 108 identifies an object such as object 106 installed on computing device 102a. For example, object 106 may be a document. At 504, LSD module 108 calculates the object's hash value. At 506, GSD module 116 determines whether the hash value is filtered by bloom filter (i.e., whether the filtered representation of the hash value exists in shared bloom filter object(s) 124). If the hash value is not filtered, at 510, LSD module 108 proceeds to scan object 106. At 512, GSD module 116 records the verdict to shared verdict database and shared bloom filter object(s) 124 by applying a bloom filter on the hash value of object 106 (i.e., LSD module 108 scans and transmits the verdict to GSD module 116). Ideally the hash value has been filtered by bloom filter at 506. If so, method 500 advances to 508, where LSD module 108 assigns the existing verdict returned from the shared bloom filter object (i.e., the probabilistic data structure). From 508 and 512, method 500 returns to 502, where LSD module 108 scans the next object in storage 104.

Figure 6:
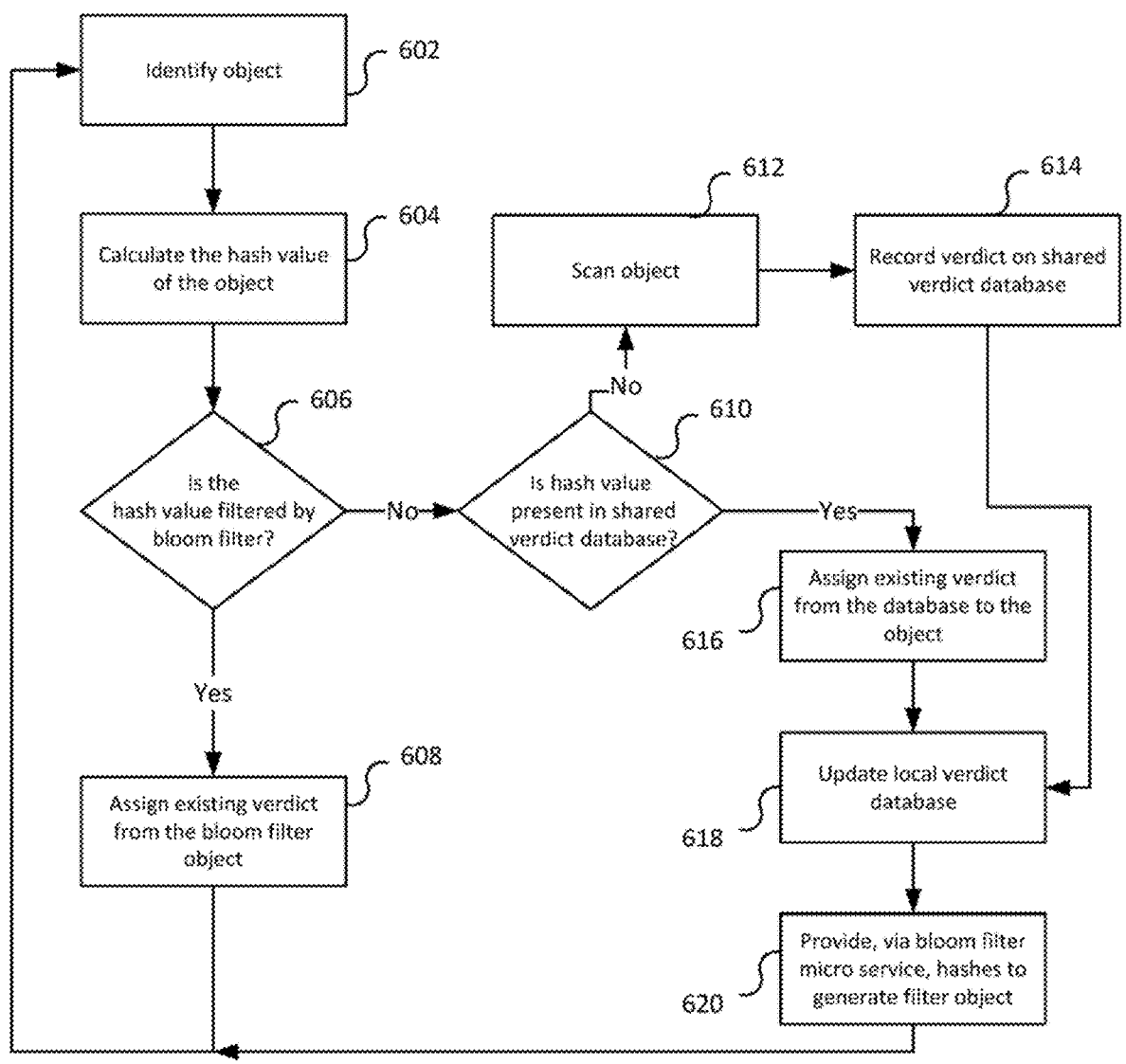
FIG. 6 is a flow diagram of a method for assigning a verdict to an object based on bloom filter objects and hashes in a remote global database.

FIG. 6 is a flow diagram of method 600 for assigning a verdict to an object based on bloom filter objects and hashes in a remote global database. In FIG. 6, a combination of the two previous methods is described where if it is not able to assign a verdict to an object using a local bloom filter (or other probabilistic data structure(s)), the scanning process queries a shared verdict database. If the object hash is present in global storage, this new verdict will be added to the local storage and will also cause the local bloom filter (or other probabilistic data structure(s)) object to be updated with a new item. Module 108 performs such operation on a set of objects by accumulating objects without verdicts and querying the remote server just once regarding the whole batch.

In the object verdicts monitoring subsystems, the information about multiple new objects appearing on numerous servers across multiple locations is used to generate alerts upon certain thresholds. Such alerts can trigger automatic or manual analyses of the new object(s) to ensure it is not new malware that is bypassing the security systems of the system. In some aspects, automated alerts generation and analyses may comprise of processing data using machine learning algorithms.

At 602, LSD module 108 identifies an object such as object 106 installed on computing device 102a. For example, object 106 may be a configuration file. At 604, LSD module 108 calculates the object's hash value. At 606, LSD module 108 determines whether the hash value is filtered by bloom filter 113. If the hash value is filtered, method 600 advances to 608, where LSD module 108 assigns the existing verdict from bloom filter object associated with bloom filter 113.

However, if the hash value is not filtered, at 610, LSD module 108 requests GSD module 116 to determine if the hash value is present in the shared verdict database. In response to determining that the hash value is not present in the shared verdict database, at 612, LSD module 108 proceeds to scan object 106. At 614, GSD module 116 records the verdict to shared verdict database (i.e., LSD module 108 scans and transmits the verdict to GSD module 116). Ideally the hash value is in the shared verdict database. If so, method 600 advances to 616, where LSD module 108 assigns the existing verdict returned from the shared verdict database. From 616 and 612, method 600 advances to 618, where LSD updates the local verdict database to match the shared verdict database. Subsequently, at 620, GSD module 116 provides the bloom filter micro service the hashes in the shared verdict database to generate the shared bloom filter object 124. In some aspects, LSD module 108 may also apply bloom filter 113 on the hash values in the updated local verdict database. From 608 and 620, method 600 returns to 602, where LSD module 108 scans the next object in storage 104.

In some aspects, GSD module 116 may fetch object(s) from a customer server (e.g., computing device 102a) for manual or automated analyses by machine learning algorithms. LSD module 108 may also update malware scanner 112 with new data (e.g., malware signatures, text string fragments, bytes sequences, hashes, etc.) if malware has been found in a fetched object upon an alert of a suspicious object.

In some aspects, rather than solely relying on bloom filters, both GSD module 116 and LSD module 108 may periodically check if any new updated space-efficient probabilistic data structure(s) similar to the bloom filter available. In response to finding such a filter, the respective modules may download the filter and apply it in place of the bloom filter.

In some aspects, multiple computing devices may share their local bloom filter objects with GSD module 116. Accordingly, GSD module 116 may use a cascade of space-efficient probabilistic data structure(s) like bloom filter or similar objects to perform the object filtration.

Figure 7:
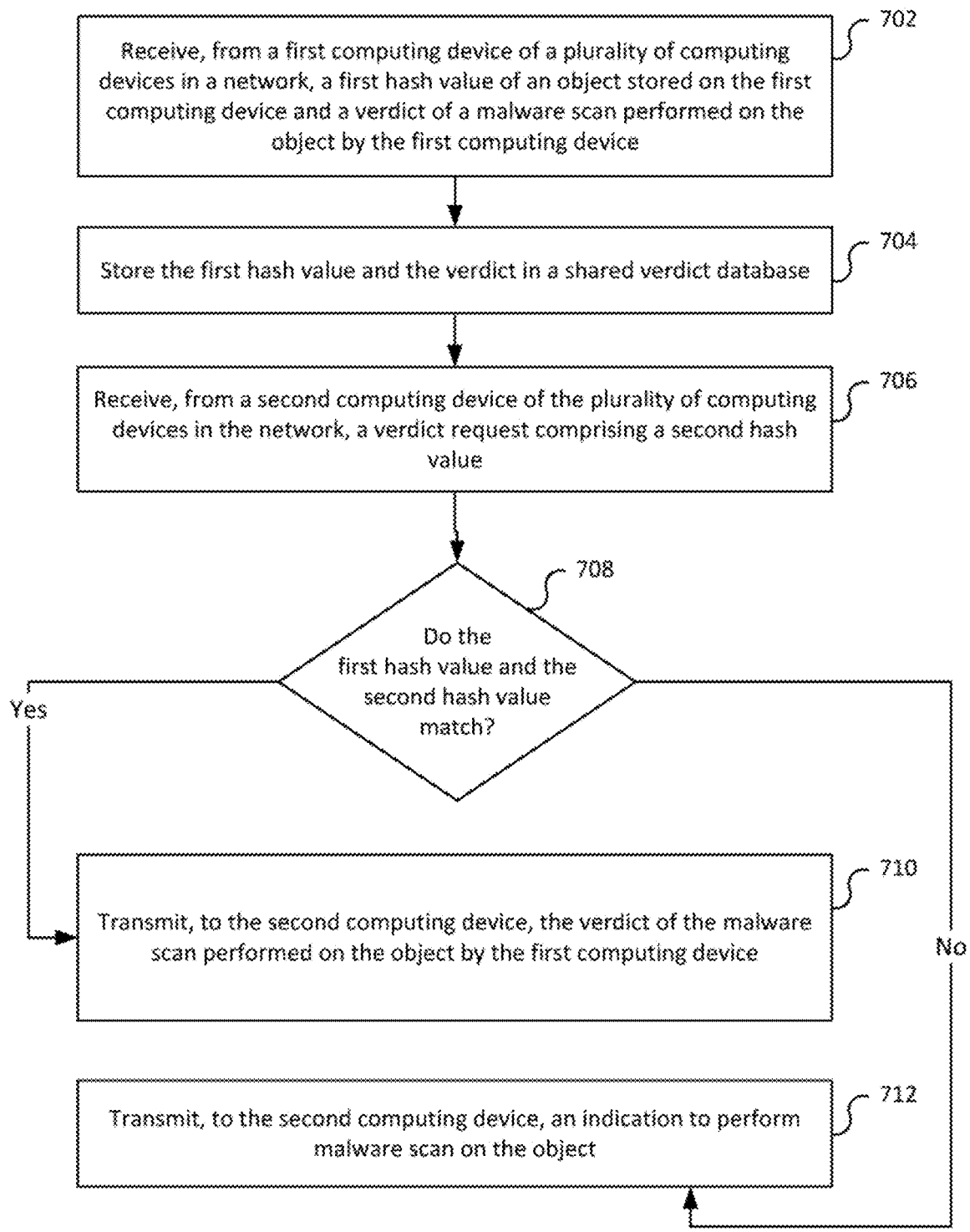
FIG. 7 is a flow diagram of a method for deduplicating malware scan attempts in a network.

FIG. 7 is a flow diagram of method 700 for deduplicating malware scan attempts in a network. At 702, GSD module 116 receives, from a first computing device (e.g., computing device 102b) of a plurality of computing devices in a network, a first hash value of an object (e.g., object 106) stored on the first computing device and a verdict of a malware scan performed on the object by the first computing device.

At 704, GSD module 116 stores the first hash value and the verdict in a shared verdict database (e.g., database 122). At 706, GSD module 116 receives, from a second computing device (e.g., computing device 102a) of the plurality of computing devices in the network, a verdict request comprising a second hash value.

At 708, GSD module 116 determines whether the first hash value and the second hash value match, wherein the match indicates that the object is stored on both the first computing device and the second computing device (i.e., both hashes are of object 106).

In response to determining the match, at 710, GSD module 116 transmits, to the second computing device, the verdict of the malware scan performed on the object by the first computing device, wherein the second computing device does not perform a redundant malware scan on the object.

In response to determining that no match exists, method 700 advances to 712, where GSD module 116 transmits, to the second computing device, an indication (e.g., an instruction) to perform the malware scan on the object.

In some aspects, prior to receiving the first hash value and the verdict associated with the object from the first computing device, GSD module 116 may receive a verdict request comprising the first hash value from the first computing device. In response to determining that the first hash value does not match any respective hash value in the shared verdict database, GSD module 116 transmits, to the first computing device, an indication to perform the malware scan locally on the object and return the verdict for storage in the shared verdict database.

In some aspects, LSD module 108 or GSD module 116 may apply a filter on the first hash value to incorporate the first hash value in a probabilistic data structure, wherein determining whether the first hash value and the second hash value match comprises determining whether a representation of the second hash value subsequent to applying the filter is present in the probabilistic data structure. In some aspects, the filter is a bloom filter and wherein the probabilistic data structure is a bloom filter object.

In some aspects, GSD module 116 may periodically transmit (e.g., after a set period of time, after a malware signature update, after a synchronization of databases with other computing devices, etc.), for local storage, a cached version of the shared verdict database to each computing device of the plurality of computing devices in the network. Each respective computing device may then generate verdict requests for the cached version (e.g., in the local verdict databases), and in response to not finding matches in the cached version, transmit the verdict requests for the shared verdict database.

In some aspects, GSD module 116 may transmit, to the second computing device, the verdict of the malware scan performed on the object by the first computing device in further response to determining that at least a threshold number of computing devices in the network independently generated the verdict for the object. For example, it is possible that a verdict from one computing device may be incorrect (i.e., the malware scanner on the computing device may have an outdated malware signature database). Rather than updating the shared verdict database due to the verdict of one computing device, GSD module 116 may accumulate verdicts from several computing devices in the network. If at least a threshold number of computing devices (e.g., 10% of the total number of computing devices in the network, 20 computing devices, etc.) arrive at the same verdict, the verdict is stored in the shared verdict database and shared with subsequent computing devices to relieve their computational demands. In some aspects, certain computing devices may assigned a greater weight such that their arrival at a particular verdict is more important than other computing devices. The determination of whether to store the verdict in the shared verdict database is based on a function that combines the verdicts based on the weights.

In some aspects, if different computing devices give differing verdicts (e.g., a first computing device determines that object 106 is non-malicious, while a different computing device determines that object 106 is malicious), GSM module 116 may perform a malware scan and store the verdict it arrives upon in the shared verdict database (overriding the local verdicts).

In one aspect, the technology of the present disclosure further establishes the monitoring of data dynamics such as how quickly files spread across servers. For example, suppose that a file N has a "non-malicious" verdict. After some period of time, the statistics on requests for the verdict on this file accumulate on the API server endpoint and it can be seen that this file is quickly spreading through multiple servers (e.g., in a few hours, the file may be present on more than 1000 servers). In this case, an alert can be issued for the malware analysts team to take a closer look at this file in order to double-check if it is in fact non-malicious.

In another aspect, the monitoring aspect can also be used for deeper analysis such as the number of servers having certain vulnerable software installed, or other parameters allowing to make decisions on cyber security features and recommendations. For example, if a files on a server are often identified as malicious, scanning may be performed on that server more often and the verdicts originating from that server may be given a higher weight than other servers.

In some aspects, GSM module 116 generates statistics for the object indicative of one or more of: (1) computing devices where the object is located, (2) a lifetime of the object on each of the computing devices, (3) an amount of changes to the object across the computing devices, and (4) an amount of verdicts for the object across the computing devices.

In some aspects, GSM module 116 generates, on a user interface, a visualization based on the statistics. For example, the user interface may depict a network map showing which computing devices include object 106 and include pop-up windows with information about the statistics described above.

In some aspects, GSM module 116 may generate rules for creating alerts on the user interface after a threshold number of duplicates of the object have formed in the network. For example, the user interface may generate an alert after object 106 is detected on 100 computing devices. Based on these alerts, GSM module 116 may trigger automatic or manual analyses of the object to ensure object 106 is not new malware that is bypassing the local security systems of the computing devices. In some aspects, GSM module 116 may generate automated alerts and analyses comprising of processing data using machine learning algorithms.

Figure 8:
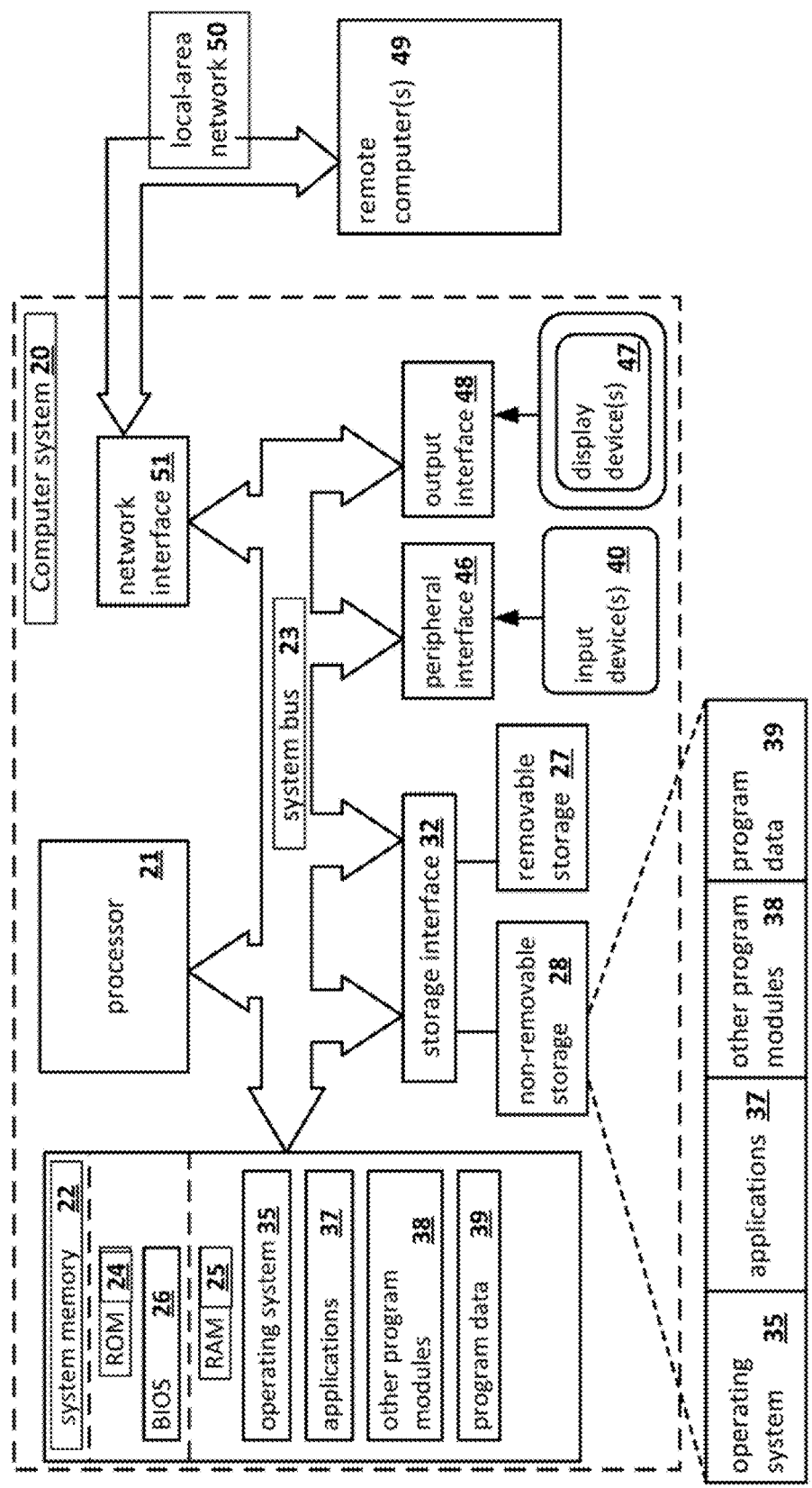
FIG. 8 presents an example of a general-purpose computer system on which aspects of the present disclosure can be implemented.

FIG. 8 is a block diagram illustrating a computer system 20 on which aspects of systems and methods for deduplicating malware scan attempts in a network may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for deduplicating malware scan attempts, the method comprising:
   receiving, from a first computing device of a plurality of computing devices in a network, a first probabilistic data structure comprising an index determined by applying a bloom filter on a first hash value of an object stored on the first computing device and a verdict of a malware scan performed on the object by the first computing device stored at the index;
   storing the first probabilistic data structure in a shared blooming filter object;
   receiving, from a second computing device of the plurality of computing devices in the network, a verdict request comprising a second hash value;
   determining that the first hash value and the second hash value match by performing a lookup of the first probabilistic data structure that yields the index when the bloom filter is applied on the second hash value, wherein the match indicates that the object is stored on both the first computing device and the second computing device; and
   in response to determining the match and determining that multiple computing devices in the network, amounting to at least a threshold number of computing devices, each independently generated the verdict for the object as indicated by lookups of each of a plurality of probabilistic data structures received from the multiple computing devices, wherein the plurality of probabilistic data structures are stored in shared blooming filter objects, transmitting, to the second computing device, the verdict of the malware scan performed on the object by the first computing device, wherein the second computing device does not perform a redundant malware scan on the object.

2. The method of claim 1, further comprising:
   prior to receiving the first hash value and the verdict associated with the object from the first computing device, receiving a verdict request comprising the first hash value; and
   in response to determining that the first hash value does not match any respective hash value in a shared verdict database, transmitting, to the first computing device, an indication to perform the malware scan locally on the object.

3. The method of claim 1, further comprising:
   periodically transmitting, for local storage, a cached version of a shared verdict database to each computing device of the plurality of computing devices in the network, wherein a respective computing device generates verdict requests for the cached version, and in response to not finding matches in the cached version, transmits the verdict requests for the shared verdict database.

4. A system for deduplicating malware scan attempts, comprising:
   a memory; and
   a hardware processor communicatively coupled with the memory and configured to:
   receive, from a first computing device of a plurality of computing devices in a network, a first probabilistic data structure comprising an index determined by applying a bloom filter on a first hash value of an object stored on the first computing device and a verdict of a malware scan performed on the object by the first computing device stored at the index;
   store the first probabilistic data structure in a shared blooming filter object;
   receive, from a second computing device of the plurality of computing devices in the network, a verdict request comprising a second hash value;
   determine that the first hash value and the second hash value match by performing a lookup of the first probabilistic data structure that yields the index when the bloom filter is applied on the second hash value, wherein the match indicates that the object is stored on both the first computing device and the second computing device; and
   in response to determining the match and determining that multiple computing devices in the network, amounting to at least a threshold number of computing devices, each independently generated the verdict for the object as indicated by lookups of each of a plurality of probabilistic data structures received from the multiple computing devices, wherein the plurality of probabilistic data structures are stored in shared blooming filter objects, transmit, to the second computing device, the verdict of the malware scan performed on the object by the first computing device, wherein the second computing device does not perform a redundant malware scan on the object.

5. The system of claim 4, wherein the hardware processor is further configured to:
   prior to receiving the first hash value and the verdict associated with the object from the first computing device, receive a verdict request comprising the first hash value; and
   in response to determining that the first hash value does not match any respective hash value in a shared verdict database, transmit, to the first computing device, an indication to perform the malware scan locally on the object.

6. The system of claim 4, wherein the hardware processor is further configured to:
periodically transmit, for local storage, a cached version of a shared verdict database to each computing device of the plurality of computing devices in the network, wherein a respective computing device generates verdict requests for the cached version, and in response to not finding matches in the cached version, transmits the verdict requests for the shared verdict database.

7. A non-transitory computer readable medium storing thereon computer executable instructions for deduplicating malware scan attempts, including instructions for:
receiving, from a first computing device of a plurality of computing devices in a network, a first probabilistic data structure comprising an index determined by applying a bloom filter on a first hash value of an object stored on the first computing device and a verdict of a malware scan performed on the object by the first computing device stored at the index;
storing the first probabilistic data structure in a shared blooming filter object;
receiving, from a second computing device of the plurality of computing devices in the network, a verdict request comprising a second hash value;
determining that the first hash value and the second hash value match by performing a lookup of the first probabilistic data structure that yields the index when the bloom filter is applied on the second hash value, wherein the match indicates that the object is stored on both the first computing device and the second computing device; and
in response to determining the match and determining that multiple computing devices in the network, amounting to at least a threshold number of computing devices, each independently generated the verdict for the object as indicated by lookups of each of a plurality of probabilistic data structures received from the multiple computing devices, wherein the plurality of probabilistic data structures are stored in shared blooming filter objects, transmitting, to the second computing device, the verdict of the malware scan performed on the object by the first computing device, wherein the second computing device does not perform a redundant malware scan on the object.

* * * * *